United States Patent
Morel et al.

(10) Patent No.: US 10,859,503 B2
(45) Date of Patent: Dec. 8, 2020

(54) ENHANCEMENT OR SUPPRESSION OF ELECTRO-MAGNETIC ATTRIBUTES VIA SECOND LASER

(71) Applicant: BAE SYSTEMS Information and Electronic Systems Integration Inc., Nashua, NH (US)

(72) Inventors: Yannick C. Morel, Falls Church, VA (US); Peter A. Budni, Nashua, NH (US); Peter A. Ketteridge, Amherst, NH (US); Michael L. Lemons, Antrim, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 119 days.

(21) Appl. No.: 16/221,841

(22) Filed: Dec. 17, 2018

(65) Prior Publication Data

US 2020/0191721 A1    Jun. 18, 2020

(51) Int. Cl.
*G01N 21/71*    (2006.01)
(52) U.S. Cl.
CPC .................. *G01N 21/718* (2013.01)
(58) Field of Classification Search
CPC ........ G01N 21/718; G01N 2201/06113; H01S 3/0326
USPC ............................................ 250/493.1, 494.1
See application file for complete search history.

(56) References Cited

U.S. PATENT DOCUMENTS

| | | | | |
|---|---|---|---|---|
| 5,394,411 A | * | 2/1995 | Milchberg | G21K 1/06 372/103 |
| 2006/0138316 A1 | * | 6/2006 | Seydoux | H01J 49/0031 250/282 |
| 2007/0096304 A1 | * | 5/2007 | Kabir | C23C 16/26 257/734 |
| 2015/0105716 A1 | * | 4/2015 | Ish-Yamini Tomer | B01J 19/088 604/23 |

OTHER PUBLICATIONS

Varma et al., "Plasma enhancement of femtosecond laser-induced electromagnetic pulses at metal and dielectric surfaces", Optical Engineering 53(5), 051515, May 2014.

* cited by examiner

*Primary Examiner* — Nicole M Ippolito
(74) *Attorney, Agent, or Firm* — KPIP Law, PLLC; Scott J. Asmus

(57) ABSTRACT

The system and method for enhancing and suppressing radio frequency (RF) emissions in a laser induced plasma system using a second laser. A first igniter laser is used at short pulse widths and a second heater laser is used at longer pulse widths. By varying the energy of the heater laser and/or the timing of the arrival of the heater laser with respect to the igniter laser suppression and/or enhancement of the radio frequency (RF) emission from the induced plasma system is possible.

20 Claims, 13 Drawing Sheets

ENHANCEMENT OR SUPPRESSION OF ELECTRO-MAGNETIC ATTRIBUTES VIA SECOND LASER

FIELD OF THE DISCLOSURE

The present disclosure relates to laser induced plasma systems and more particularly to the use of a second laser to enhance or suppress the electromagnetic properties of the laser induced plasma system.

BACKGROUND OF THE DISCLOSURE

High power electromagnetic pulses produced by laser induced plasma in air or on solid targets can potentially be deployed as a high power microwave (HPM) weapon to disrupt or destroy adversarial electronics. Conventional HPM weapons have a range limitation due to ~$1/R^2$ power drop-off with distance. In some cases, a laser triggered plasma weapon (LTPW) can overcome such limitations by creating the HPM pulse close to a target at a significant stand-off distance.

Conventional laser induced plasma systems have attempted to enhance the emissions of these plasma but there is a need for tighter, more predictable control of the emissions, and the ability to not only enhance, but suppress emissions. In some cases, full modulation and/or encoding of the emission are another desired functionality. Wherefore it is an object of the present disclosure to overcome the above-mentioned shortcomings and drawbacks associated with the conventional laser-induced plasma systems.

SUMMARY OF THE DISCLOSURE

One aspect of the present disclosure is a method of modulating emissions in a laser induced plasma system, comprising: propagating a laser beam from an igniter laser to form a plasma spark or filament, the spark or filament is created near the geometric focus of optics where a light intensity is strong enough to initiate air breakdown; propagating a laser beam from a heater laser to place the beam on top of the spark or filament; and enhancing or suppressing emissions from the laser induced plasma system by modulating the heater laser.

One embodiment of the method of modulating emissions in a laser induced plasma system is wherein the igniter beam is focused by either a single lens for short distance (<1 m) or by a telescope for longer distance (>1 m).

Another embodiment of the method of modulating emissions in a laser induced plasma system is wherein the igniter laser emits picosecond or femtosecond pulses. In some cases, the igniter laser is a Ti:Sapphire laser. In certain embodiments, the heater laser is a Nd:Yag or a $CO_2$ laser.

Yet another embodiment of the method of modulating emissions in a laser induced plasma system is wherein the $CO_2$ heater laser is at 1 Hz and is synchronized with the igniter laser at 10 Hz. In some cases, the Nd:Yag heater laser is at 410 mJ.

Still yet another embodiment of the method of modulating emissions in a laser induced plasma system is wherein the Nd:Yag heater laser has a time delay of about −20 ns to about 1 ns thereby enhancing the RF emissions. In some cases, the Nd:Yag heater laser has a time delay of about 1 ns to about 160 us thereby suppressing the RF emissions.

In some embodiments, the igniter emits short pulses in the femtosecond range, the RF enhancement being about 2× on metals and about 5× on dielectrics and suppression being about 3× to about 10×.

In certain embodiments, the igniter emits pulses in the picosecond range, such that only RF suppression is seen despite changes in time and/or energy for the heater laser.

Another aspect of the present disclosure is a system for modulating emissions in a laser induced plasma system, comprising: an igniter laser configured to form a plasma spark or filament, the spark or filament being created near the geometric focus of optics where a light intensity is strong enough to initiate air breakdown; a heater laser configured to place a laser beam on top of the spark or filament; and a modulator for enhancing or suppressing emissions from the laser induced plasma system by changing the energy and/or timing of the heater laser with respect to the igniter laser, wherein the optics comprise a single lens for shorter distances and a telescope for longer distances.

One embodiment of the system of modulating emissions in a laser induced plasma system is wherein the igniter laser is a Ti:Sapphire laser and has picosecond or femtosecond pulses.

Another embodiment of the system of modulating emissions in a laser induced plasma system is wherein the heater laser is a Nd:Yag or a $CO_2$ laser emitting longer pulses than the igniter. In some cases, the Nd:Yag heater laser is at 410 mJ.

In certain embodiments, the $CO_2$ heater laser is at 1 Hz and is synchronized with the igniter laser at 10 Hz.

Yet another embodiment of the system of modulating emissions in a laser induced plasma system is wherein the Nd:Yag heater laser has a time delay of about −20 ns to about 1 ns thereby enhancing the RF emissions.

Still yet another embodiment of the system of modulating emissions in a laser induced plasma system is wherein the Nd:Yag heater laser has a time delay of about 1 ns to about 160 us thereby suppressing the RF emissions.

In certain embodiments, the igniter has a femtosecond range pulsewidth, the RF enhancement being about 2× on metals and about 5× on dielectrics and suppression being about 3× to about 10×.

In some embodiments, the igniter has a picosecond range pulsewidth, such that only RF suppression is seen despite changes in time and/or energy for the heater laser.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

One embodiment of the system of the present disclosure extends or suppresses the radio frequency (RF) emission from laser induced plasma via a second laser. In some cases, precision synchronization of the dual laser system is used. In some cases, energy adjustment of the second laser is used.

In certain embodiments, a short pulse laser (igniter laser) is focused to create a plasma filament that generates RF emission. The RF emission can then be amplified or suppressed by adding a second laser (heater laser) on top of the filament. Depending on the respective timing of the two lasers and the energy of the heater laser, one can modulate the amplitude of the RF emission.

One potential use of the system is in on-the-fly modulation of the RF emission from laser induced plasma, such as when the encoding of signals is desired. Another potential use of the system of the present disclosure is as a countermeasure to RF emissions using laser induced plasma.

Figure 1:
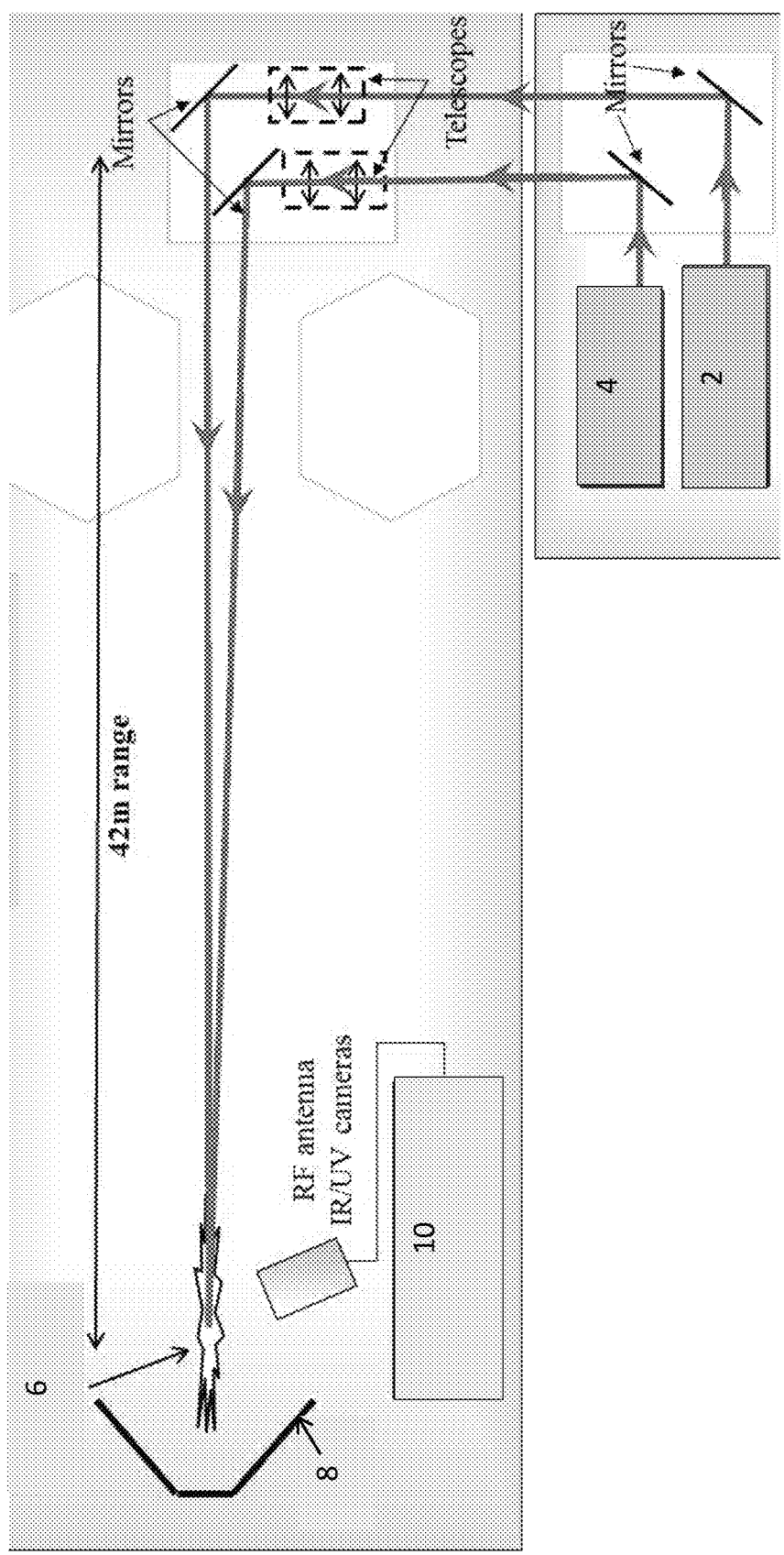
FIG. 1 shows one embodiment of a set-up of the system to capture emission of the laser induced plasma at long distance according to the present disclosure.

One embodiment of an experimental setup used in this effort is shown in FIG. 1. There, the main laser used to generate the plasma filaments was a Ti:Sapphire laser with a pulse compressor capable of generating pulses as short as 100 fs with 100 mJ of energy per pulse at a wavelength of about 800 nm. In one embodiment, adjustment of the pulse compressor allowed an increase in the pulse width to several ps.

In order to generate plasma filaments, the beam was focused by either a single lens for short distance (<1 m) or by a set of lenses arranged in a telescope for longer distance (>1 m). Plasma filaments were created near the geometric focus of the optics where the light intensity was strong enough to initiate air breakdown.

The RF signal emitted by the plasma filament was captured using a d-dot probe or a horn antenna placed in the vicinity of the filament and linked to a high speed oscilloscope. The d-dot/horn and oscilloscope detection method was ideally suited to measure fast, transient signals. The d-dot probe measured the derivative of the electric field with time while the horn antenna measured radiated power directly. Integration of the d-dot measurement yields the time varying electric field of the RF signal. In both cases, the RF frequency bandwidth was obtained through a numerical Fast Fourier Transform (FFT) of the electric field. In one embodiment, the detector frequency limits were 250 kHz to 10 GHz for the d-dot probe and 0.75 GHz to 18 GHz for the horn. While these are detector limits, it is understood that the short pulse nature of the emission creates broadband electromagnetic pulses covering a very broad frequency range from typical RF bands to THz generation.

In some cases, measurements were done using a dual laser setup (heater/igniter configuration) where a second laser beam (heater) was superimposed onto the initial beam (igniter), which was used to generate the plasma filament in order to enhance the plasma characteristics. In one embodiment, two types of laser were used as "heater": a Q-switched Nd:YAG with ~10 ns pulse width and energy up to 7 J per pulse at a wavelength of 1064 nm and a $CO_2$ laser with pulse width ~100 ns and energy up to 400 mJ at a wavelength of 10.6 um.

Referring to FIG. 1, one embodiment of a set-up of the system to capture radio frequency (RF) emission of the laser induced plasma at long distance according to the present disclosure is shown. More specifically, a first laser 2 is a femtosecond (fs) laser used as an "igniter" laser to form a plasma filament. In one embodiment, the fs laser is a mode locked Ti:Sapphire oscillator amplified up to terawatt peak power at 10 Hz repetition-rate. This laser is based on a multi-stage chirped pulse amplifier consisting of a grating-based pulse stretcher, regenerative amplifier for first-stage amplification, one or more power amplifier stages, followed by a grating-based pulse compressor. In one embodiment, the igniter laser pulses parameters were less than 100 fs pulsewidth, and 10 Hz repetition rate, 95 mJ per pulse. In one embodiment, a lens and grating spacing were also used.

Still referring to FIG. 1, a second laser 4 is used as a "heater" laser. The second laser may be a typical ns class laser, such as a Q-switched Nd:Yag laser. In one embodiment, the second laser was operating at 10 Hz repetition rate, producing pulses with 100-2000 mJ of energy with a 10 ns pulsewidth. In one embodiment a lens was also used. In some cases, the lasers were directed using a plurality of mirrors. In one embodiment, the two laser beams were passed through telescopes for longer range testing. In this embodiment, a plasma filament 6 was produced at a range of about 42 m. Beam blockers 8 were used for shielding and measurement instrumentation 10, including oscilloscopes, were used to characterize the emission of the system.

In some cases, the plasma created at a short distance (1 m) in air and on a target was several cm long. At long distances, the filaments can reach several meters in length. In another embodiment, the igniter laser was the Ti:Sapphire laser and the heater was a CO2 laser with 100 ns pulsewidth operating at 1 Hz repetition rate. Experiments were first conducted at 1 m distance with the Ti:Sapphire laser at <100 fs pulse width and the Nd:YAG laser was used as a heater laser on a steel target.

Figure 2:
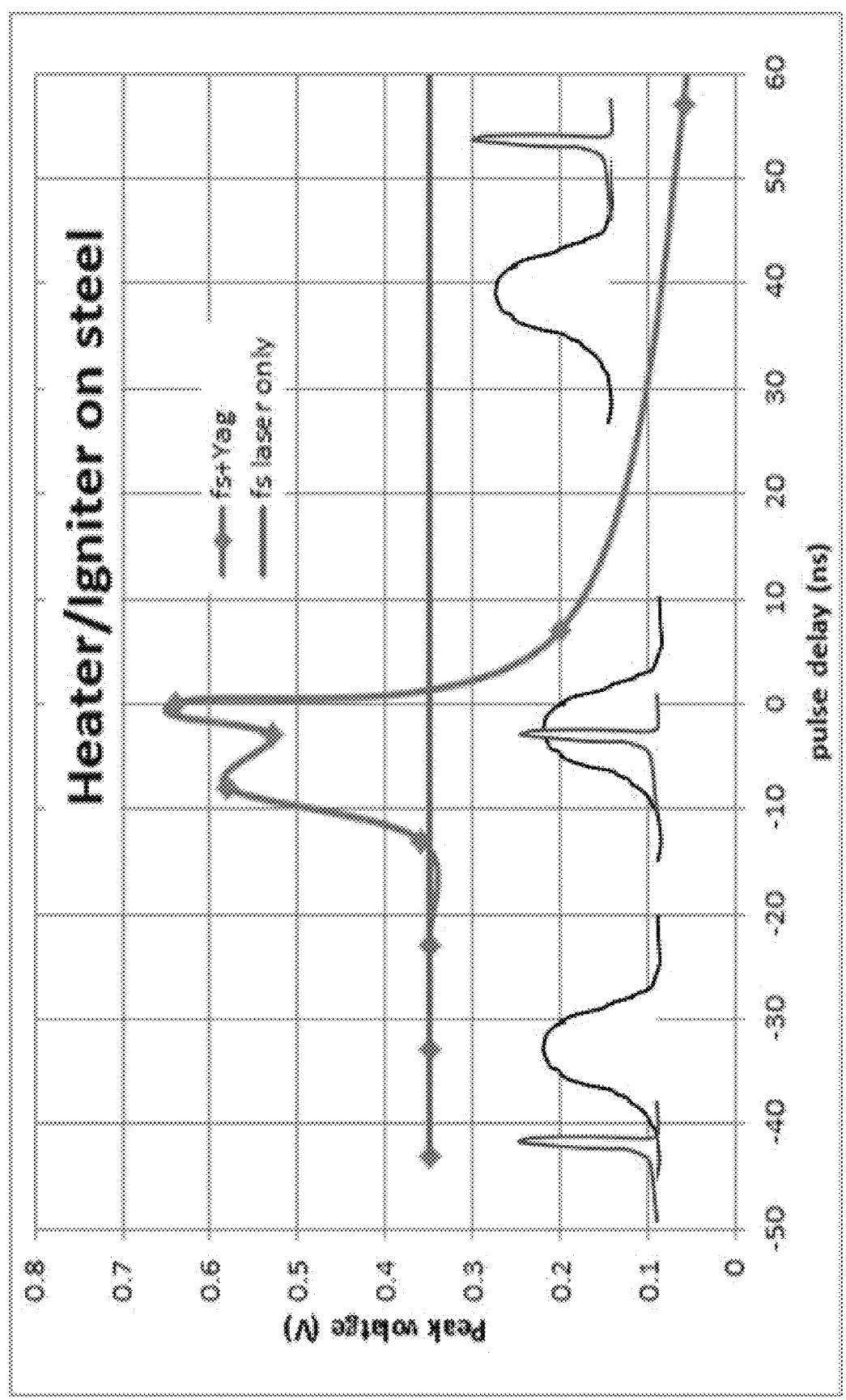
FIG. 2 is a plot showing the dependence of the radio frequency (RF) emission with laser synchronization for a laser induced plasma on a steel target according to one embodiment of the present disclosure.

Referring to FIG. 2, a plot showing the amplitude dependence of the radio frequency (RF) emission as a function of the two lasers synchronization for a plasma induced on a steel target according to one embodiment of the present disclosure is shown. More specifically, the Nd:Yag laser energy was at 410 mJ. FIG. 2 shows the change in electric field amplitude as a function of delay between the two lasers. The fs laser alone is shown with a peak voltage of about 0.35 V. As the pulse synchronization for the second laser changes, it can be seen that the peak voltage is unchanged for delay ranging from about −50 to about −20 ns; and then from −20 ns to about 0 ns delay the emission is enhanced up to about 0.65 V. In one embodiment of the system of the present disclosure, as the delay in the second laser is from 0 to about 60 ns the RF emissions are actually suppressed down to about 0.05 V.

Still referring to FIG. 2, it can be seen that when the heater laser arrives after the igniter laser (negative delay longer than 10 ns), no effects can be seen compared to the case of the igniter laser only. However, when both lasers start to overlap (negative delay from −10 ns to zero delay), it can be seen that the RF amplitude is increased. However, when the heater laser arrives first on the target (positive delay), the RF emitted by the plasma is reduced. It should be noted that the RF suppression effects is strong and lasts for an extended period of time, much longer than the heater laser pulse width. Using a short pulse Hidra with fs pulsewidth as igniter, both suppression and enhancement can be seen depending on timing.

Figure 3:
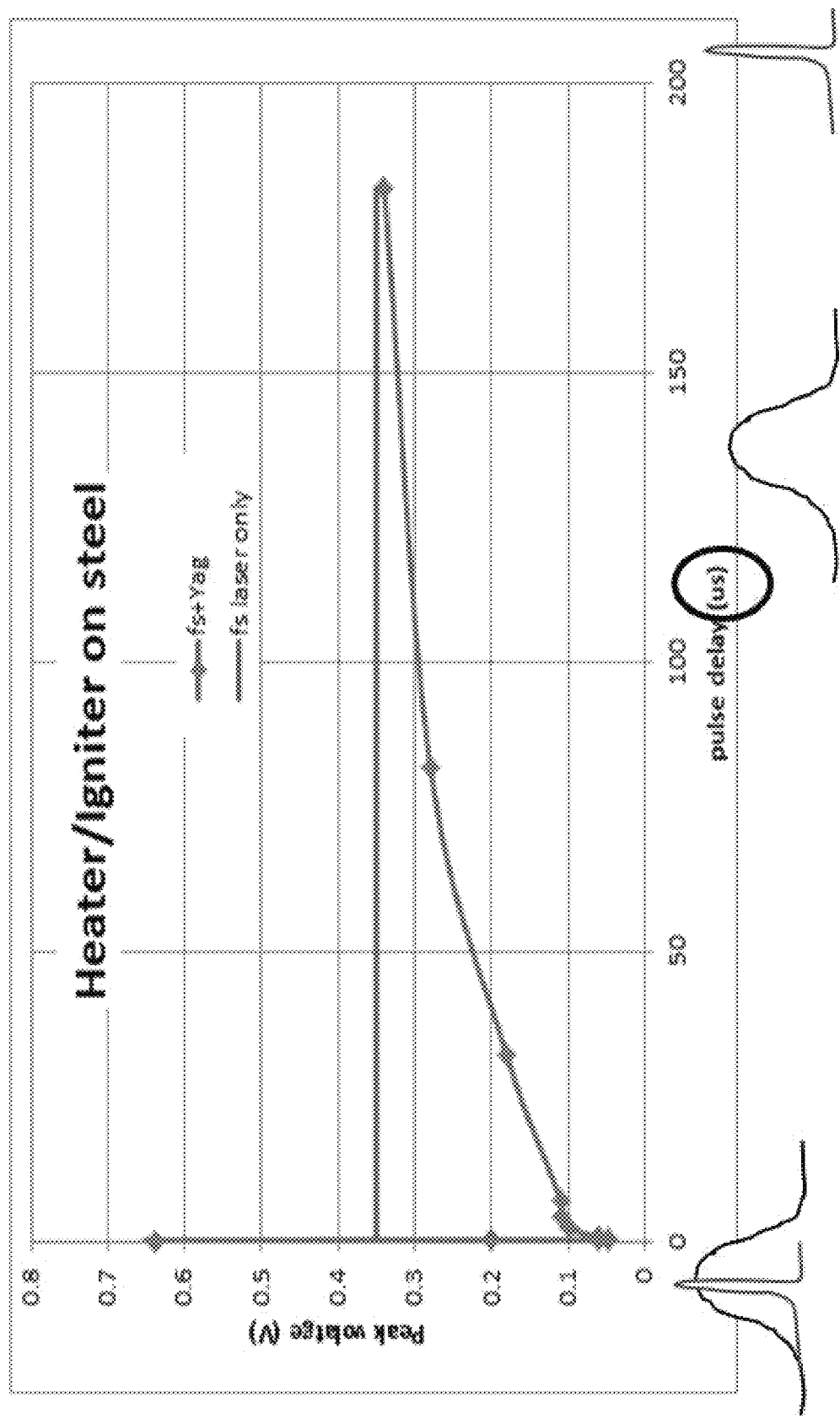
FIG. 3 is a plot showing the dependence of the radio frequency (RF) emission with laser synchronization for a laser induced plasma on a steel target according to one embodiment of the present disclosure as a continuation of FIG. 2, on a longer timescale.

Referring to FIG. 3, a plot showing the amplitude dependence of the radio frequency (RF) emission as a function of the two lasers synchronization for laser induced plasma on a steel target according to one embodiment of the present disclosure is shown. More specifically FIG. 3, which is a continuation of FIG. 2 for extended positive delay, shows that it takes almost 200 us of pulse delay before the suppression effect disappears and the RF emission produced by the igniter is unperturbed. These curves were obtained for the heater laser at 410 mJ, which is where the highest RF enhancement was observed. At lower energy, similar or less enhancement was observed. On the other hand, at higher energy the RF enhancement was reduced and for energy above 1 J, the RF was only suppressed regardless of the timing relationship for the two lasers. Overall, RF enhancement with the dual laser is difficult to achieve because the timing accuracy and the heater energy must be carefully controlled and maintained.

Similar results (enhancement/suppression) were obtained on a Sapphire target under the same conditions. However, when the igniter laser was run in the ~1 ps pulse width mode, no RF enhancement was observed, only RF suppression was seen regardless of timing, energy of the heater laser, and the target materials.

Experiments were also conducted on the heater/igniter configuration at the 40 m range. In that case, only RF suppression was observed. Finally, when the Nd:YAG laser was replaced by a $CO_2$ laser as the "heater" laser, effects were less visible and only RF suppression was achieved when an effect was seen.

Figure 4:
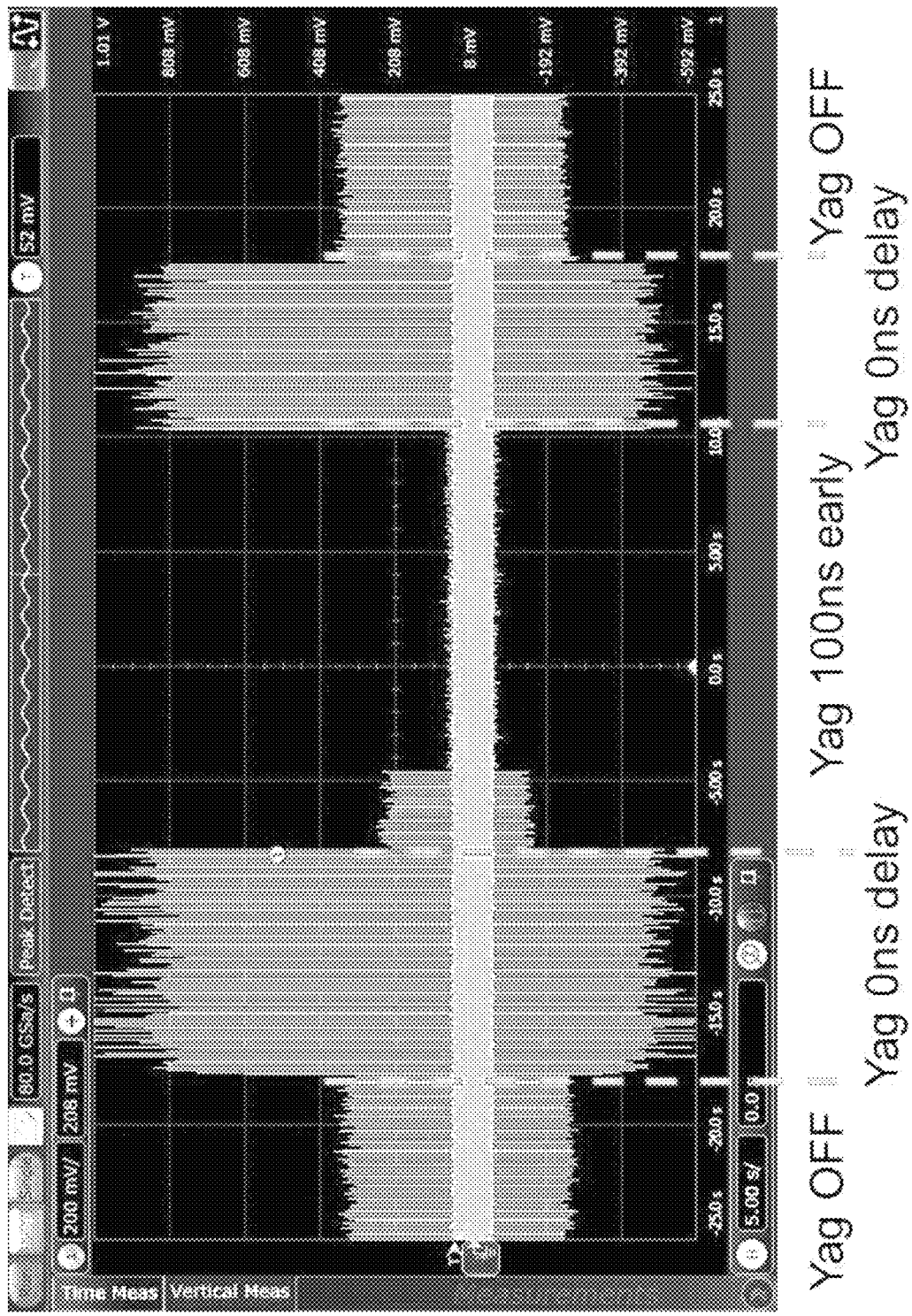
FIG. 4 is a plot showing one embodiment of a modulation of the radio frequency (RF) amplitude from laser induced plasma on a copper target according to one embodiment of the present disclosure.

Referring to FIG. 4, a plot showing one embodiment of a modulation of the radio frequency (RF) amplitude from laser induced plasma on a copper target according to one embodiment of the present disclosure is shown. More specifically, by changing the synchronization of the two lasers, one can modulate the RF emission on the fly. Here, a Hidra laser was the first, or "igniter" laser and an Nd:Yag laser was used as the "heater" laser. In this figure, both suppression and enhancement are shown as well as "unperturbed" when the Nd:Yag laser is OFF. The 0 ns delay corresponds to the case where both lasers are synchronized such as their pulses overlap perfectly.

Figure 5:
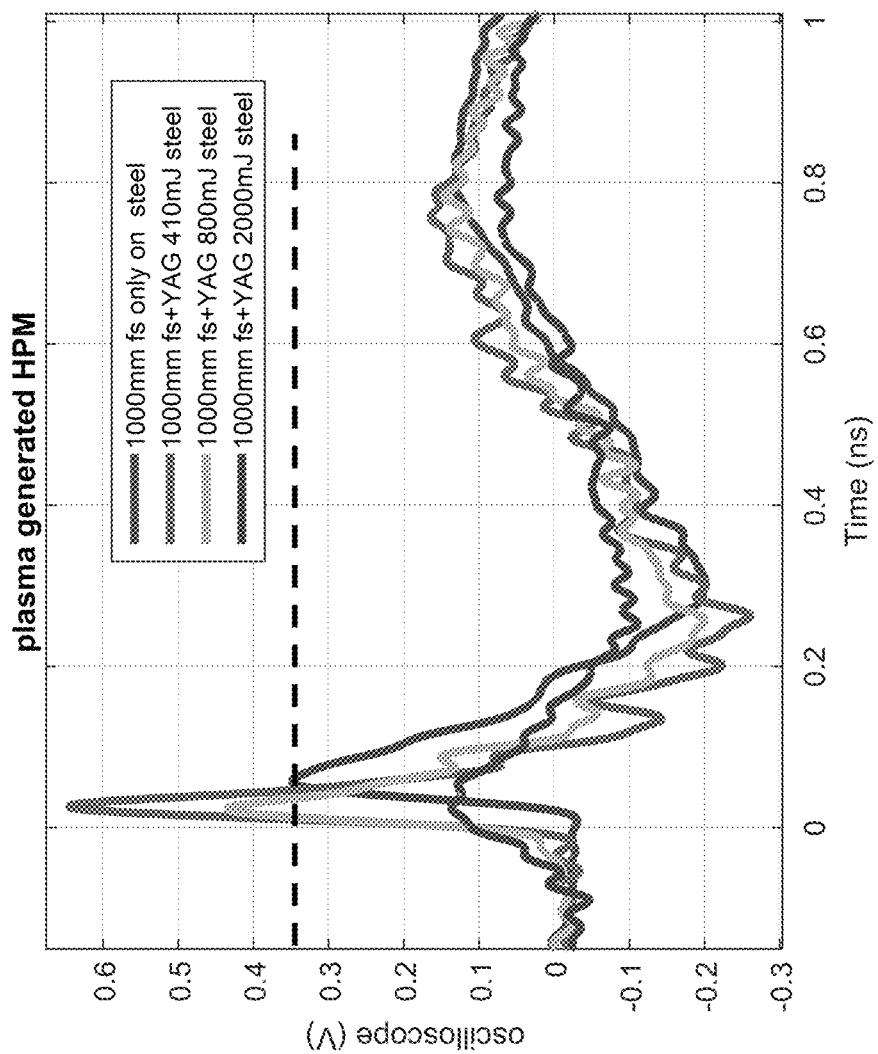
FIG. 5 is a plot showing the dependence of the emission as a function of heater laser energy according to one embodiment of the present disclosure.

Referring to FIG. 5, a plot showing the dependence of RF emission as a function of heater laser energy according to one embodiment of the present disclosure is shown. More specifically, in this figure it is shown that enhancement at low energy can turn to loss at high energy. This is demonstrated as above and below the dotted line, which represents the unperturbed emission from the igniter laser alone. Thus, not only is timing important to controlling the extent of the RF emissions, but the energy of the heater laser is as well.

Figure 6:
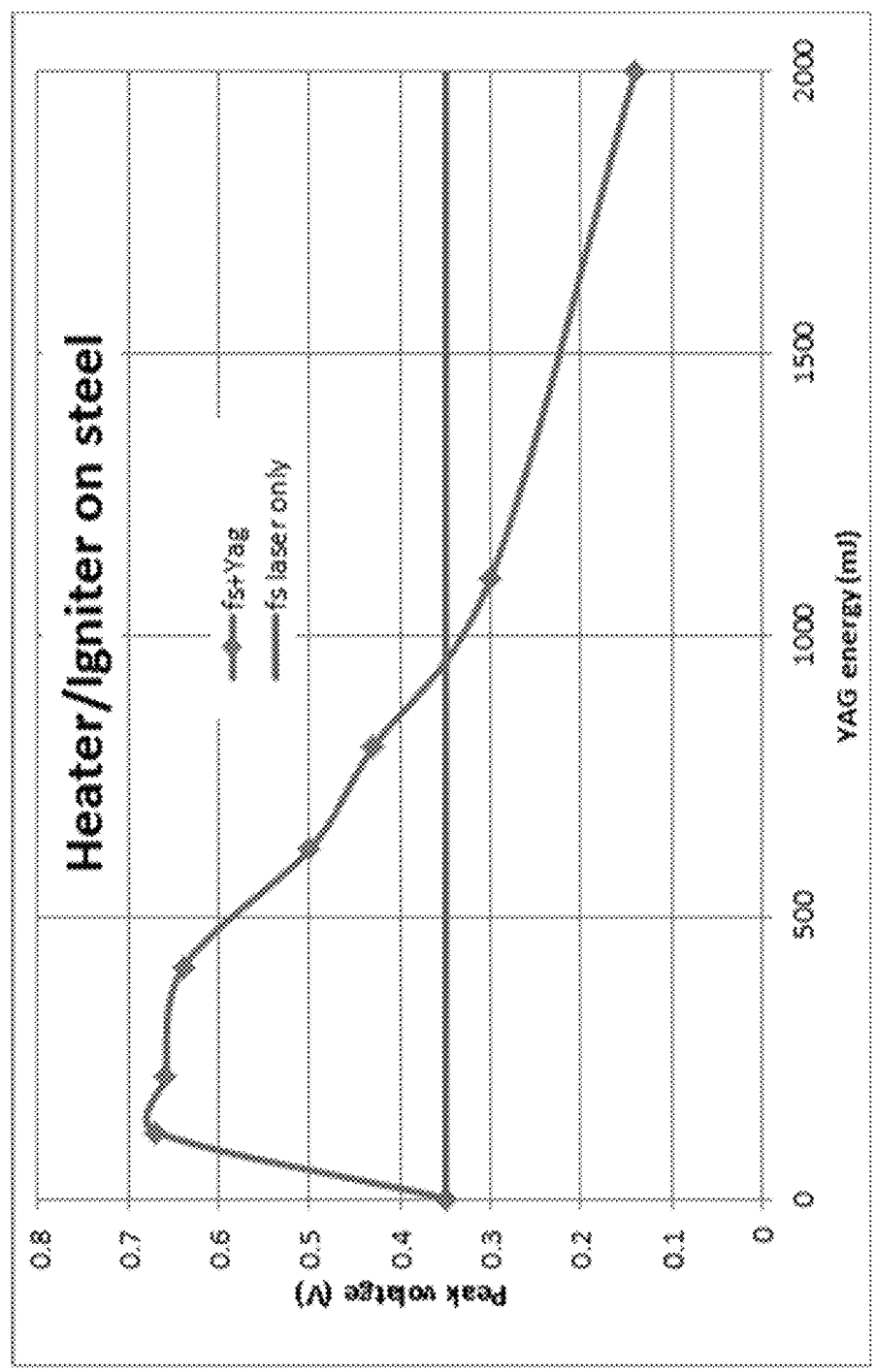
FIG. 6 is a plot showing the dependence of the emission as a function of heater laser energy according to one embodiment of the present disclosure.

Referring to FIG. 6, a plot showing the dependence of the peak RF emission as a function of heater laser energy according to one embodiment of the present disclosure is shown. More specifically, enhancement at low energy can turn to loss at high energy. In this figure, the transition occurs at about 1000 mJ for the Nd:Yag laser.

Figure 7A:
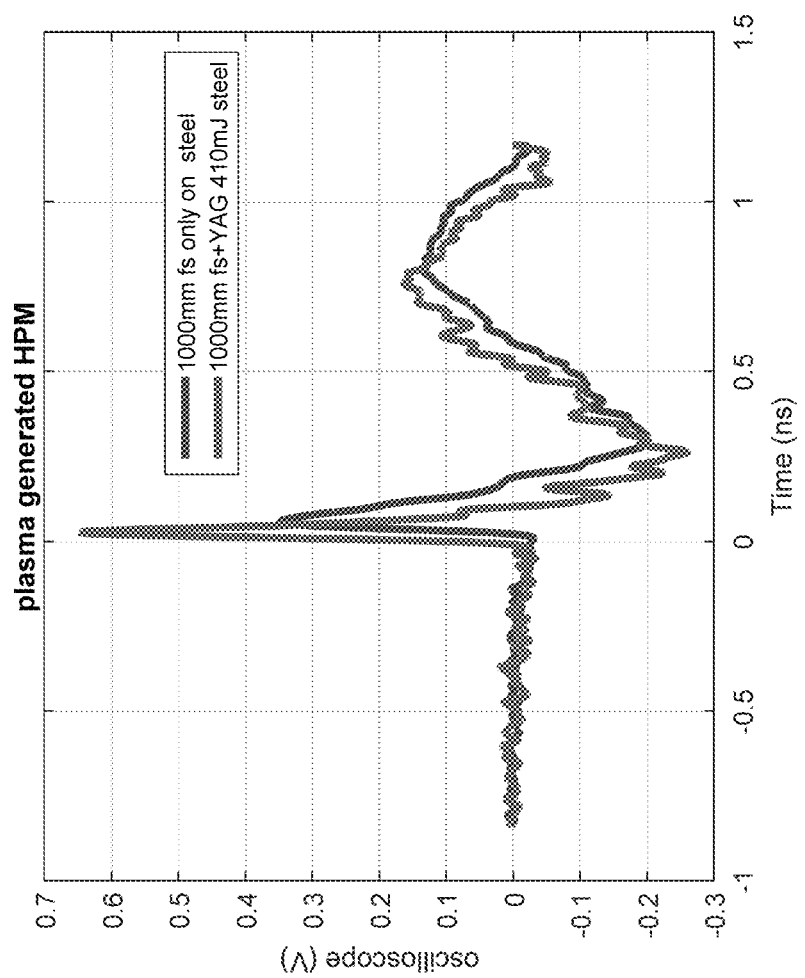
FIG. 7A is a plot showing amplitude enhancement on metals in one embodiment of the system of the present disclosure.

Referring to FIG. 7A, a plot showing amplitude enhancement on metals in one embodiment of the system of the present disclosure is shown. More specifically, amplitude enhancement of about 2× on steel is shown when using the 100 fs Hidra as igniter and the Nd:Yag at 410 mJ as the heater.

Figure 7B:
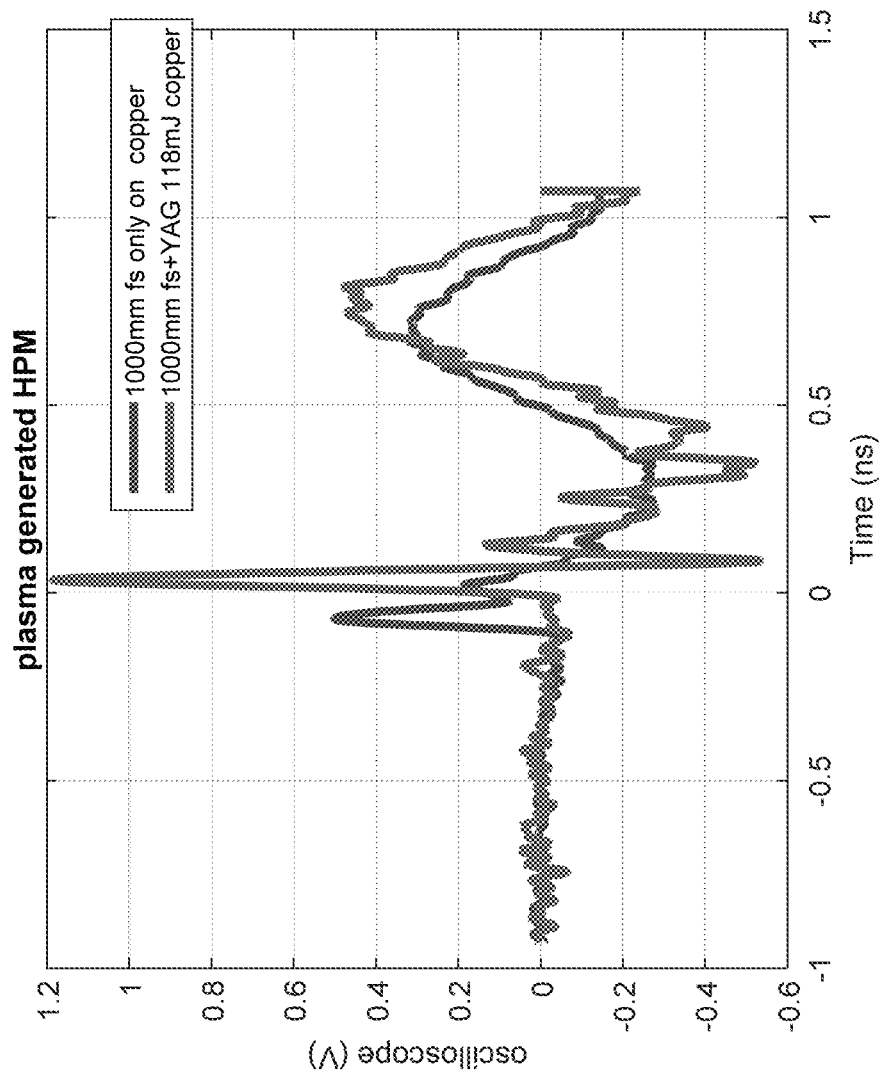
FIG. 7B is a plot showing amplitude enhancement on metals in one embodiment of the system of the present disclosure.

Referring to FIG. 7B, a plot showing amplitude enhancement on metals in one embodiment of the system of the present disclosure is shown. More specifically, amplitude enhancement of about 3× on copper is shown when using the 100 fs Hidra as igniter and the Nd:Yag at 118 mJ as the heater.

Figure 8A:
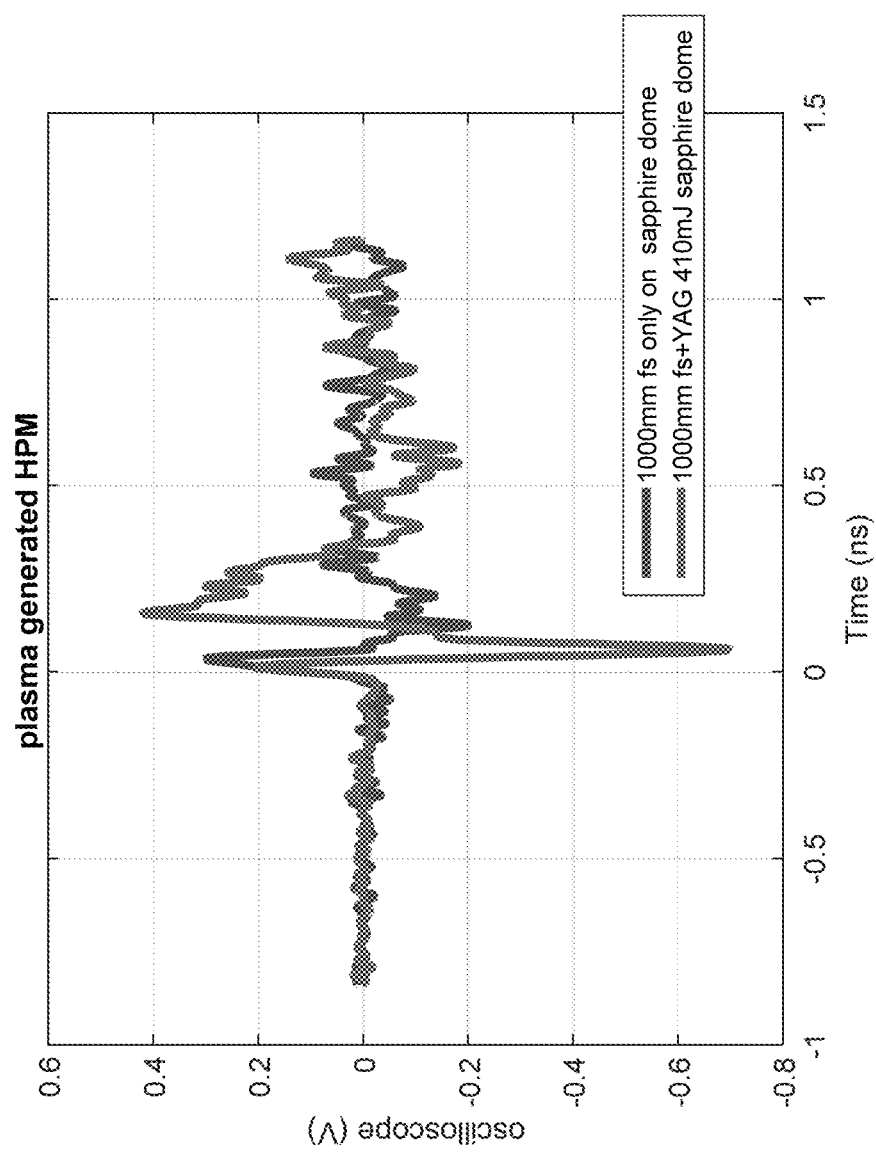
FIG. 8A is a plot showing amplitude enhancement on dielectrics in one embodiment of the system of the present disclosure.

Referring to FIG. 8A, a plot showing amplitude enhancement on dielectrics in one embodiment of the system of the present disclosure is shown. More specifically, amplitude enhancement of about 3×-5× on sapphire is shown. There was large variation from shot to shot due in part to accelerated degradation of the material. Here, the heater laser was Nd:Yag at 410 mJ.

Figure 8B:
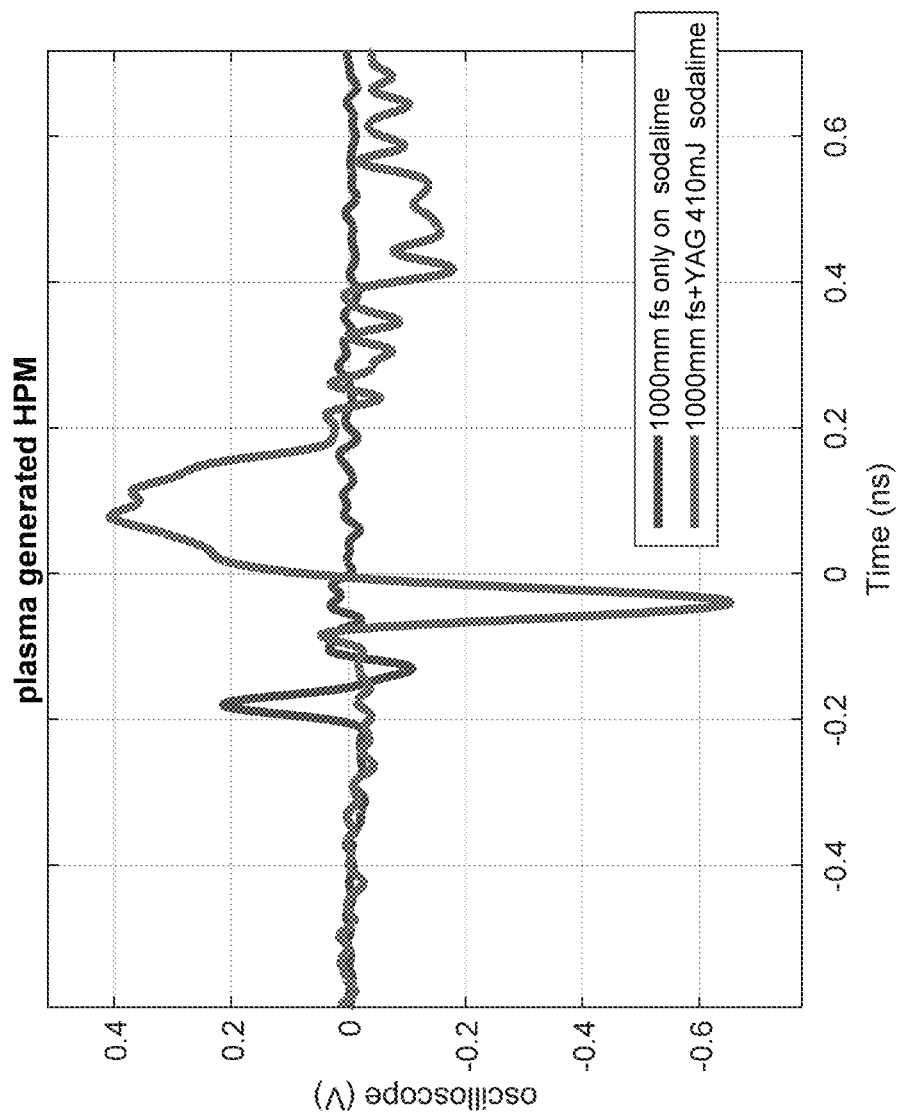
FIG. 8B is a plot showing amplitude enhancement on dielectrics in one embodiment of the system of the present disclosure.

Referring to FIG. 8B, a plot showing amplitude enhancement on dielectrics in one embodiment of the system of the present disclosure is shown. More specifically, amplitude enhancement of about 3×-5× on soda lime glass is shown. Here, the heater laser was Nd:Yag at 410 mJ.

Figures 9A, 9B:
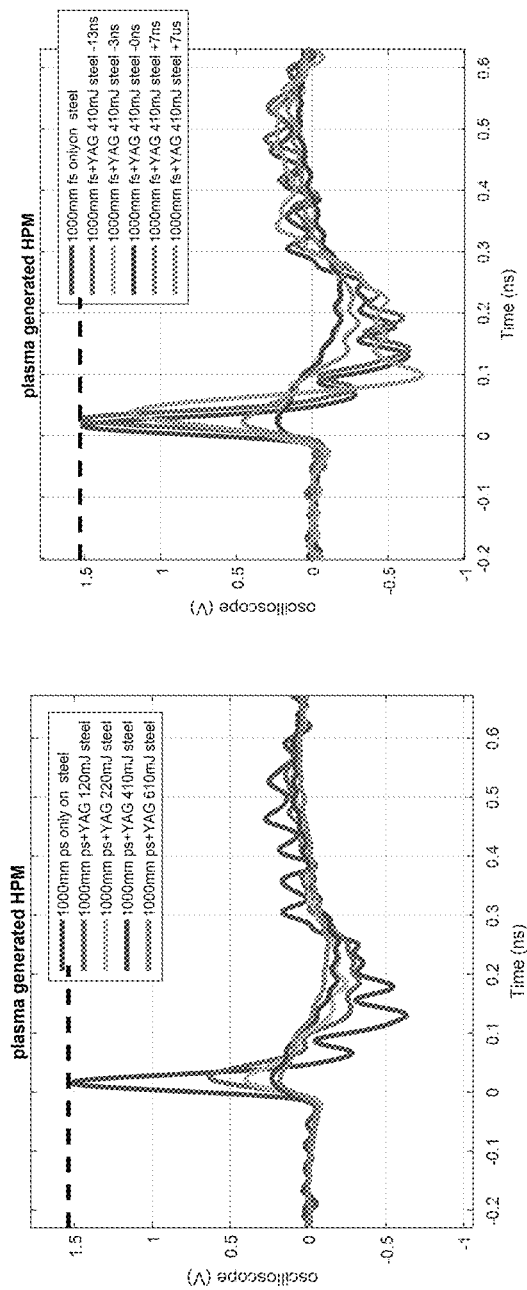
FIG. 9A is a plot showing amplitude suppression as a function heater laser energy according to one embodiment of the system of the present disclosure.
FIG. 9B is a plot showing amplitude suppression as a function of heater laser synchronization according to one embodiment of the system of the present disclosure.

Referring to FIG. 9A, a plot showing amplitude suppression according to one embodiment of the system of the present disclosure is shown. With a ps pulsewidth laser used as igniter instead of 100 fs, the heater provides little opportunity for enhancement and many for RF suppression. The best enhancement was about 2× on metals and about 5× on dielectrics. Suppression was ranging from about 3× to 10× was seen. This was shown with both an Nd:Yag and $CO_2$ laser as heater laser. In this figure, the heater laser energy is varied while the synchronization between the igniter and heater laser is maintained at zero delay, i.e. both laser pulse overlapping in time.

Figure 10:
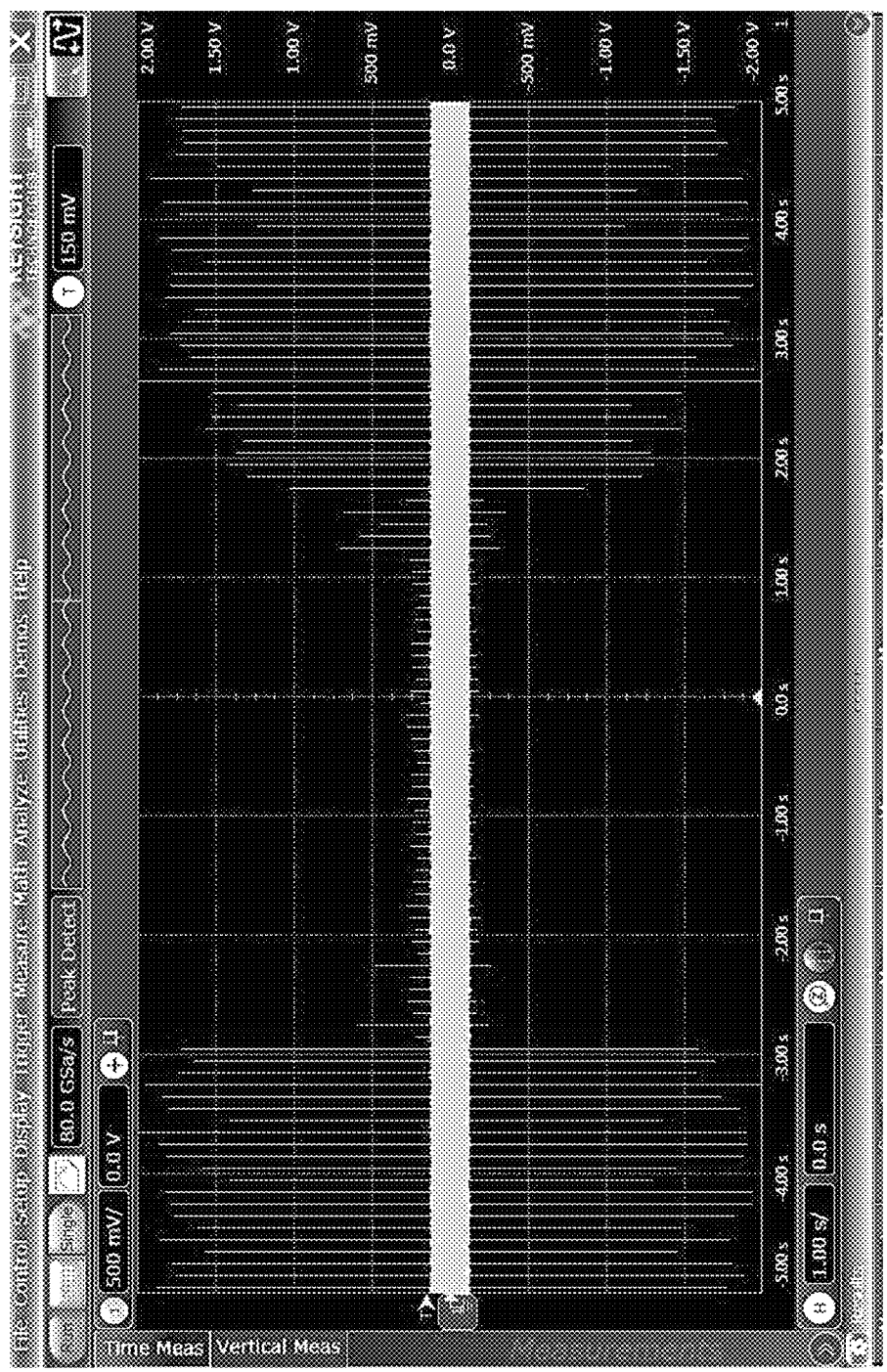
FIG. 10 is a plot showing one embodiment of a modulation of the radio frequency (RF) amplitude from laser induced plasma on a copper target according to one embodiment of the present disclosure.

Referring to FIG. 9B, a plot showing amplitude suppression according to one embodiment of the system of the present disclosure is shown. More specifically, with a ps pulsewidth laser used as igniter instead of 100 fs, only RF suppression was seen when the heater laser synchronization was change. RF emission suppression was noticed for negative, zero and positive delay, which is in contrast to what was observed with the 100 fs pulsewidth igniter laser where enhancement could be seen close to the zero delay Referring to FIG. 10, a plot showing one embodiment of a modulation of the radio frequency (RF) amplitude from laser induced plasma on a copper target according to one embodiment of the present disclosure is shown. More specifically, the igniter laser was a ps pulsewidth laser operating at 10 Hz, and 95 mJ energy. The heater laser was a Nd:YAG, at 10 Hz, 400 mJ. In certain embodiments one or more lenses and/or grating spacing was also used.

Figure 11:
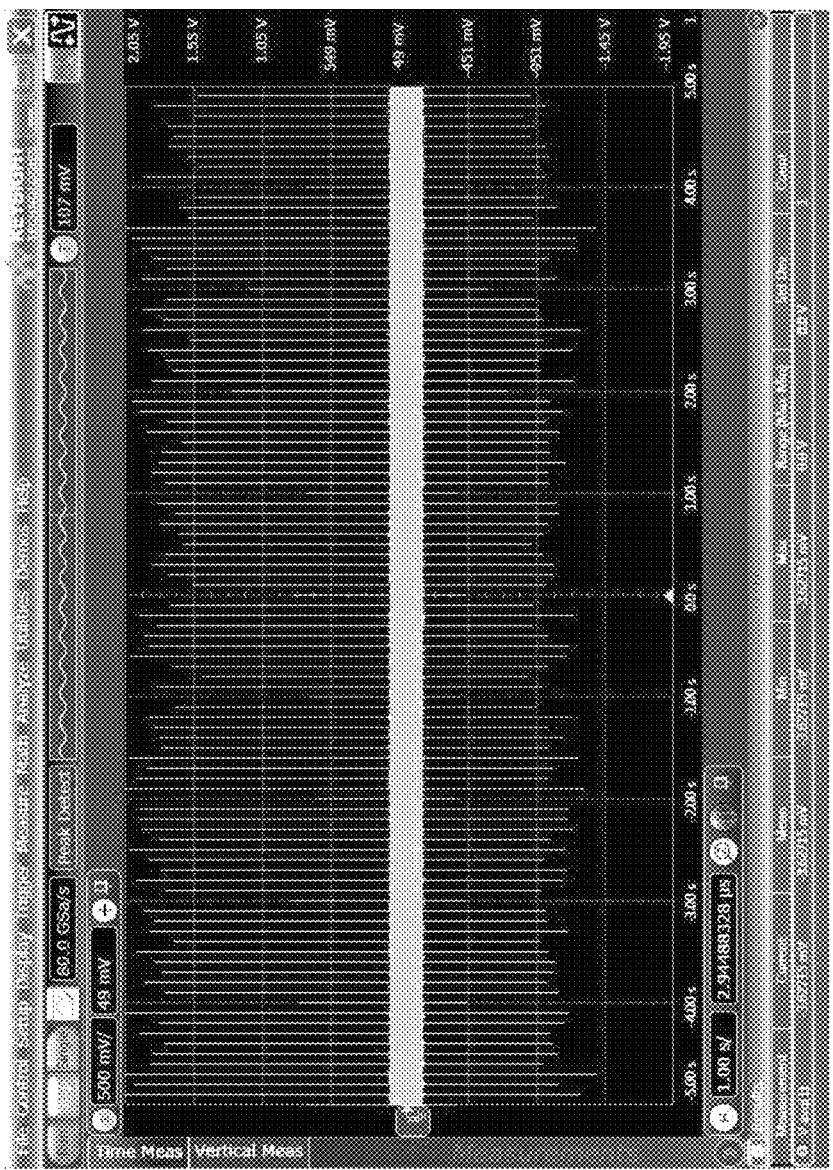
FIG. 11 is a plot showing one embodiment of a modulation of the radio frequency (RF) amplitude from laser induced plasma on an aluminum target according to one embodiment of the present disclosure.

Referring to FIG. 11, a plot showing one embodiment of a modulation of the radio frequency (RF) amplitude from laser induced plasma on an aluminum target according to one embodiment of the present disclosure is shown. More specifically, the addition of a $CO_2$ laser decreases the RF emission. In this embodiment, the igniter laser was a ps pulsewidth laser at 10 Hz, 95 mJ. The heater laser was a $CO_2$ at 1 Hz, 400 mJ. Since the $CO_2$ was operating at 1 Hz, it was synchronized with the igniter at 10 Hz only once every 10 shots as shown by the periodic suppression of signals across the plot. This type of modulation by adjusting the repetition rate of the heater laser is in contrast to modulation by adjusting the timing of the heater with respect to the igniter.

While various embodiments of the present invention have been described in details, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of modulating RF emissions in a laser induced plasma system, comprising:
   propagating an igniter laser beam from an igniter laser to form a plasma spark or filament, wherein the plasma spark or filament generates RF emissions, and wherein the spark or filament is created near the geometric focus of optics where a light intensity is strong enough to initiate air breakdown;
   propagating a heater laser beam from a heater laser to place the heater laser beam on top of the plasma spark or filament; and
   enhancing or suppressing the RF emissions by modulating the heater laser and synchronizing with the igniter laser.

2. The method of modulating RF emissions in a laser induced plasma system according to claim 1, wherein the igniter laser beam is focused by either a single lens for short distance (<1 m) or by a telescope for longer distance (>1 m).

3. The method of modulating RF emissions in a laser induced plasma system according to claim 1, wherein the igniter laser emits picosecond or femtosecond pulses.

4. The method of modulating RF emissions in a laser induced plasma system according to claim 3, wherein the igniter laser emits short pulses in the femtosecond range, the RF emission enhancement is about 2× on metals and about 5× on dielectrics and suppression is about 3× to about 10×.

5. The method of modulating RF emissions in a laser induced plasma system according to claim 3, wherein the igniter laser emits pulses in the picosecond range, such that only the RF emission suppression is seen despite changes in time and/or energy for the heater laser.

6. The method of modulating RF emissions in a laser induced plasma system according to claim 1, wherein the igniter laser is a Ti:Sapphire laser.

7. The method of modulating RF emissions in a laser induced plasma system according to claim 1, wherein the heater laser is a Nd:Yag or a $CO_2$ heater laser.

8. The method of modulating RF emissions in a laser induced plasma system according to claim 7, wherein the $CO_2$ heater laser is at 1 Hz and is synchronized with the igniter laser at 10 Hz.

9. The method of modulating RF emissions in a laser induced plasma system according to claim 7, wherein the Nd:Yag heater laser is at 410 mJ.

10. The method of modulating RF emissions in a laser induced plasma system according to claim 7, wherein the Nd:Yag heater laser has a time delay of about −20 ns to about 1 ns thereby enhancing the RF emissions.

11. The method of modulating RF emissions in a laser induced plasma system according to claim 7, wherein the Nd:Yag heater laser has a time delay of about 1 ns to about 160 us thereby suppressing the RF emissions.

12. A system for modulating RF emissions in a laser induced plasma system, comprising:
   an igniter laser configured to form a plasma spark or filament, the spark or filament being created near the geometric focus of optics where a light intensity is strong enough to initiate air breakdown, wherein the plasma spark or filament generates RF emissions;
   a heater laser configured to place a heater laser beam on top of the spark or filament; and
   a modulator for enhancing or suppressing the RF emissions from the laser induced plasma system by changing the energy and/or pulse synchronization of the heater laser with respect to the igniter laser, wherein the optics comprise a single lens for shorter distances and a telescope for longer distances.

13. The system of modulating RF emissions in a laser induced plasma system according to claim 12, wherein the igniter laser is a Ti:Sapphire laser and has picosecond or femtosecond pulses.

14. The system of modulating RF emissions in a laser induced plasma system according to claim 13, wherein the igniter laser has a femtosecond range pulsewidth, the RF emission enhancement is about 2× on metals and about 5× on dielectrics and suppression is about 3× to about 10×.

15. The system of modulating RF emissions in a laser induced plasma system according to claim 13, wherein the RF emissions are suppressed when the igniter laser has a picosecond range pulsewidth, despite changes in time and/or energy for the heater laser.

16. The system of modulating RF emissions in a laser induced plasma system according to claim 12, wherein the heater laser is a Nd:Yag or a $CO_2$ heater laser emitting longer pulses than the igniter laser.

17. The system of modulating RF emissions in a laser induced plasma system according to claim 16, wherein the $CO_2$ heater laser is at 1 Hz and is synchronized with the igniter laser at 10 Hz.

18. The system of modulating RF emissions in a laser induced plasma system according to claim 16, wherein the Nd:Yag heater laser is at 410 mJ.

19. The system of modulating RF emissions in a laser induced plasma system according to claim 16, wherein the Nd:Yag heater laser has a time delay of about −20 ns to about 1 ns thereby enhancing the RF emissions.

20. The system of modulating RF emissions in a laser induced plasma system according to claim 16, wherein the Nd:Yag heater laser has a time delay of about 1 ns to about 160 us thereby suppressing the RF emissions.

* * * * *